June 27, 1967

R. W. RYNO ET AL 3,328,541

ELECTRICAL CODE ELEMENT READER FOR
USE IN HAZARDOUS LOCATIONS

Filed July 20, 1965

INVENTORS.
ROBERT W. RYNO
GILBERT A. SCHWIBINGER
BY
Andrus & Starke
ATTORNEYS

June 27, 1967 R. W. RYNO ET AL 3,328,541
ELECTRICAL CODE ELEMENT READER FOR
USE IN HAZARDOUS LOCATIONS Filed July 20, 1965 3 Sheets-Sheet 2

INVENTORS.
ROBERT W. RYNO
GILBERT A. SCHWIBINGER
BY
Andrus & Starke
ATTORNEYS

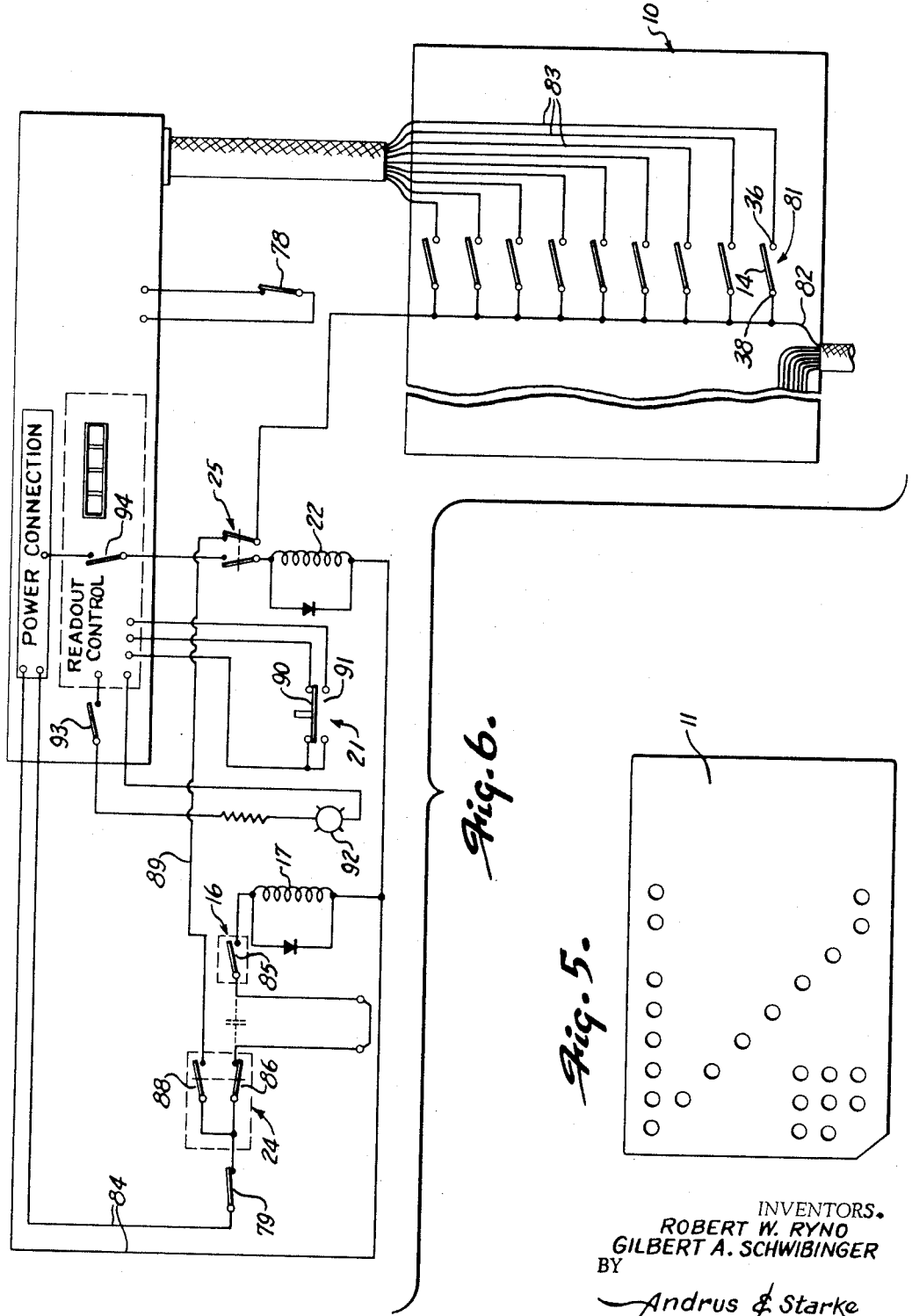

United States Patent Office 3,328,541
Patented June 27, 1967

3,328,541
ELECTRICAL CODE ELEMENT READER FOR USE
IN HAZARDOUS LOCATIONS
Robert W. Ryno, Mequon, and Gilbert A. Schwibinger,
Oconomowoc, Wis., assignors to A. O. Smith Corporation, Milwaukee, Wis., a corporation of New York
Filed July 20, 1965, Ser. No. 473,332
17 Claims. (Cl. 200—46)

This invention relates to an electrical code element reader and particularly to a code reader for operation in hazardous locations.

In the bulk distribution of gasoline and other petroleum products, unattended bulk loading stations or terminals have been provided to permit maximum utilization of the terminals and the trucks. One such system employs a key control controlling the dispensing and recording of products dispensed. Each authorized customer is provided with a keyed control at the bulk station and the proper driver or drivers has a key for the corresponding control. By inserting the key into the associated control, the driver directly dispenses the product to his truck and the amount of product withdrawn is automatically recorded in a suitable recording device. However, bulk loading terminals inherently involve highly explosive environments and consequently all electrical controls must meet very rigid standards to minimize and essentially eliminate all and every condition or operation which could create a possibility of an explosion. Thus, the provision of a practical and economical coded control presents unique problems. Key operated systems have been satisfactorily employed but are not adapted to systems requiring a substantial number of customers and/or multiple function controls. A highly satisfactory system employing an explosion proof enclosure is shown in the copending application of Robert W. Ryno and Gilbert A. Schwibinger entitled, Magnetic Card Reader which was filed on July 6, 1964, with Ser. No. 380,347. The latter system employs a magnetic card reader for magnetically actuating a plurality of switches housed within an explosion proof housing and permits control of a greater number of customers and functions than key type controls.

A code control employing a punched card or the like would be desirable because it permits a great permutation of code combinations and thereby substantially increases the flexibility of the control system. A punched card or similar device thus has a substantial advantage in that it allows insertion of a substantial amount of information and control for each customer in a relatively small card as well as increasing the number of customers which can be accommodated without involving an unduly cumbersome enclosure. However, the electrical reading of such cards requires making and breaking of electrical circuits and thus presents a source of electrical arcs which could cause explosions in the environment of a bulk plant.

The present invention is particularly directed to an improved code reader for punched cards and the like in which the generation of arcs is essentially eliminated. In accordance with the present invention, the card reader employs a circuit having hermetically sealed switches to make and break the main power circuit of the card reader with the contacts maintained in a static or dead position whenever current is applied and removed. In this manner, essentially all danger of generating explosion forming sparks is eliminated.

Generally, in accordance with a preferred construction of the present invention, a card reader, disposed within a suitable weatherproof enclosure for exterior mounting, is provided having a plurality of reading or code contacts selectively movable into engagement and disengagement with corresponding fixed contacts. The reading contacts are normally locked against all possible movement from a standby position. Insertion of a code card actuates a first hermetically sealed switch means connected in a release circuit having means to release the card reader contacts for movement to a reading position; after which they may be moved automatically or manually to the reading position. A delay circuit or device is provided in accordance with one aspect of this invention to positively prevent the application of power to the reading contacts until they have moved and are stopped in a completely static condition.

When the reading contacts are to be reset for removal of the code card, a hermetically sealed switch must be first actuated to remove power from the reader contacts. Further, for maximum safety, all operations are made dependent upon the energizing of a coil such that any failure in the energizing circuit and related components prevents the making or breaking of the card reader contacts in the presence of a current.

In summary, hermetically enclosed switches are employed to condition the circuit of the contacts such that the contacts never interrupt a current. Consequently, the highly developed conventional punched card reader can be safely employed in very hazardous locations without enclosing the reader in an explosion proof enclosure to provide a highly versatile unit at a minimum cost.

The drawings furnished herewith illustrate a preferred construction of the present invention in which the above advantages and features as well as others will be clear from the following description of the drawings.

In the drawings:

FIG. 5 is a plan elevational view of a code card for application to the reader shown in FIGS. 1–4; and FIG. 6 is a schematic circuit diagram showing a control circuit incorporating the card reader of FIGS. 1–4 for controlling a dispensing operation.

Figure 1:
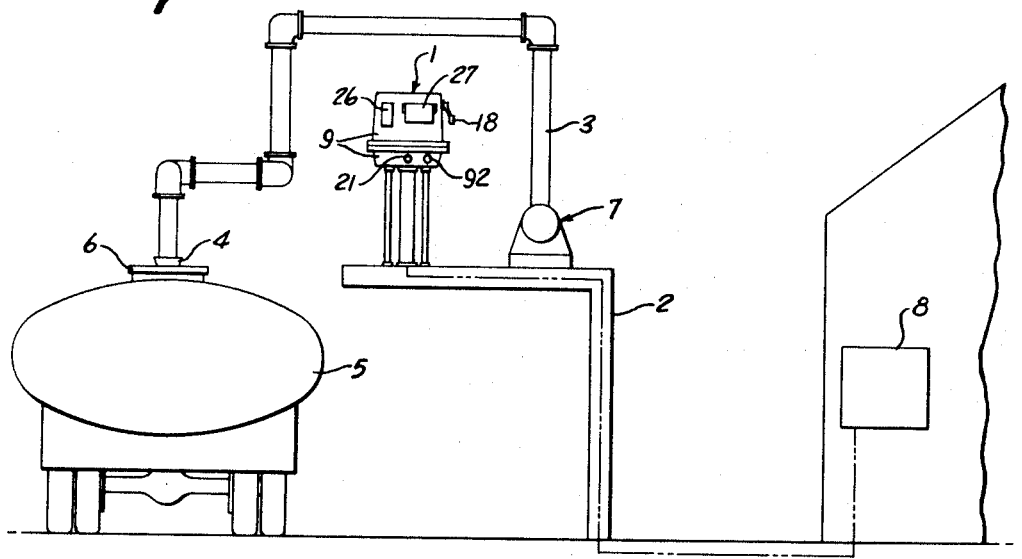
FIG. 1 is a diagrammatic illustration of a petroleum product bulk plant showing the code reading structure of the present invention in elevation.

Referring to the drawings and particularly to FIG. 1, the present invention is shown and described in connection with a bulk plant or loading terminal for gasoline and other petroleum products. Generally, a weatherproof enclosed code card reader unit 1, constructed in accordance with the present invention, is mounted immediately at a loading platform 2. A flow line 3 from a suitable storage means, not shown, terminates in a discharge nozzle 4 at the platform. The terminal end of the line 3 is movably mounted to permit lateral movement to loading areas on each side of the platform. The platform is raised above the ground area such that a tank truck 5 or other suitable carrier may be positioned to one side of the platform 2 and a top loading opening 6 located to conveniently receive the discharge nozzle 4 of flow pipe 3. A motor-pump unit 7 is shown in the line 3 for controlling flow. In actual practice, a controlled valving system may be employed but as such is not of significance to an understanding of the present invention, a simplified illustration has been made. The card reader unit 1 is connected through a central control station 8 which controls the unit 7 and therefore the discharge of gasoline or other suitable petroleum products from the corresponding storage tanks, not shown, through the flow pipe 3. The control station 8 also provides for automatic recording of each delivery as well as other desired functions. The particular details of the motor-pump unit 7 and the interconnecting control station 8, other than as they relate directly to the operation of the card reader unit 1, are not of particular significance in connection with the present invention and have also been shown diagrammatically. No further description thereof is given herein other than as appears necessary to clearly understand and describe the operation of the present invention.

Figure 2:
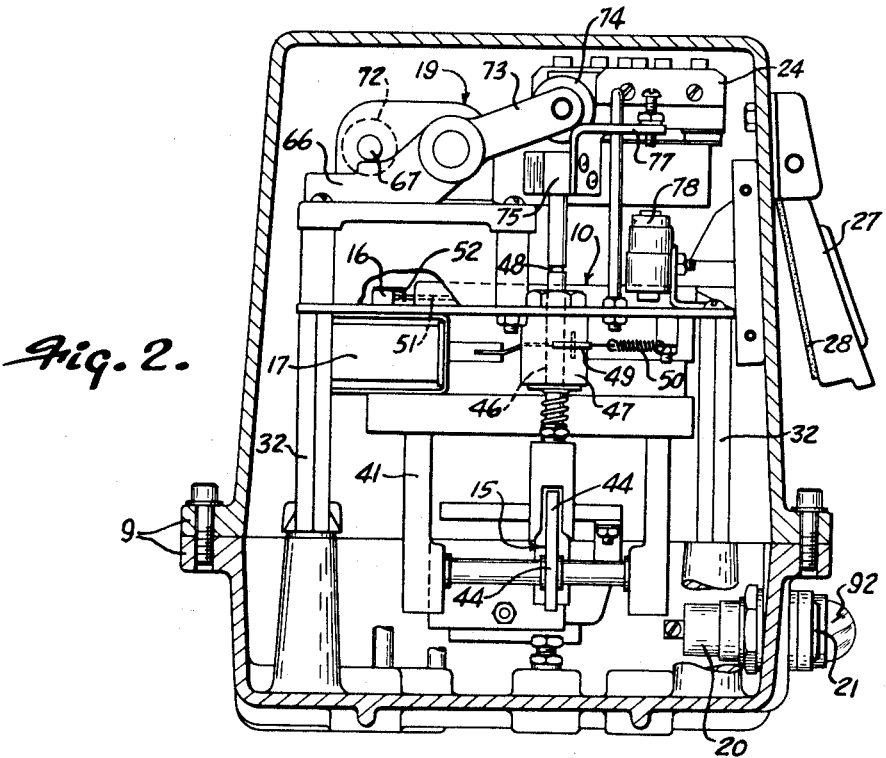
FIG. 2 is an enlarged side view of the card reader with the wall portion removed to show inner details of construction.
Figure 4:
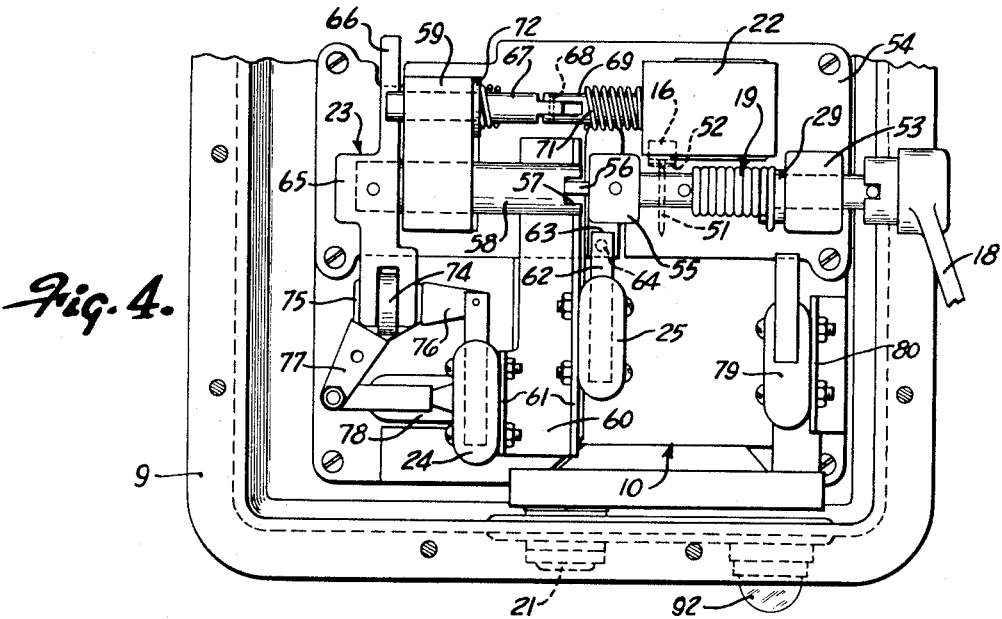
FIG. 4 is a similar top view of the card reader.
Figure 3:
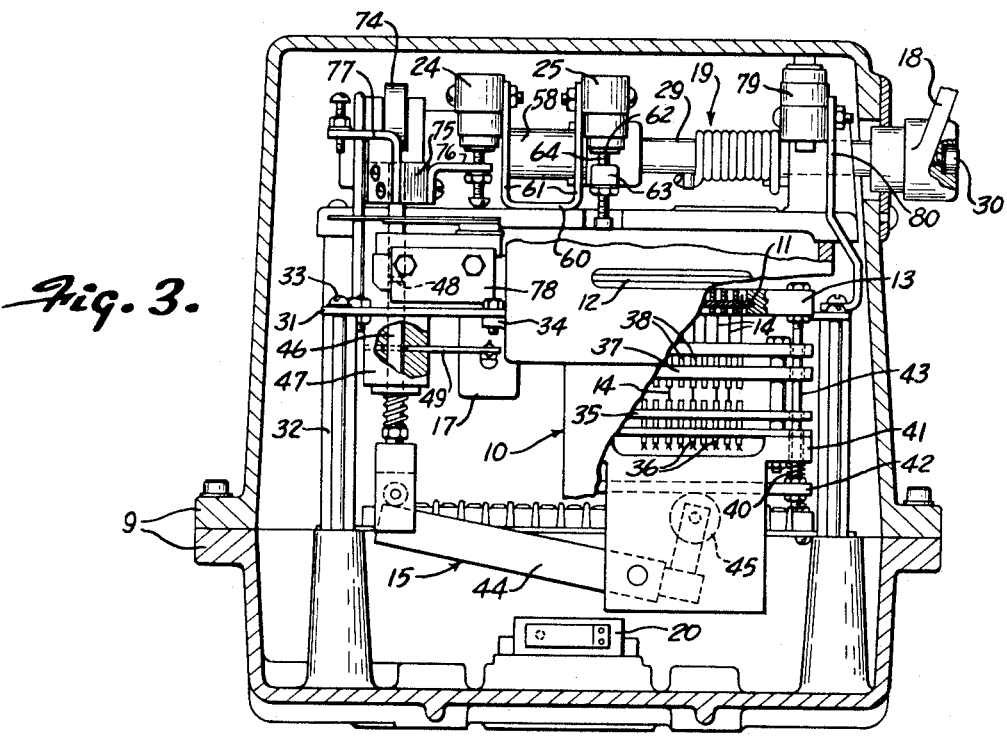
FIG. 3 is a similar front view of the card reader.

Generally, as shown in FIGS. 2-4 the card reader unit 1 of the present invention includes a two piece weatherproof, although not explosion proof, housing 9 within which a punched card reader 10 is mounted. A code card 11 such as shown for example in FIG. 5 is releasably insertable into the card reader 10 through a suitable covered opening 12 in the front of the weatherproof housing.

The reader 10 employed in the illustrated embodiment of the present invention is more fully disclosed in U.S. Patent 2,924,678 and is only briefly described herein to clearly describe the present invention. Generally, reader 10 includes an apertured platen 13 within which the code card 11 is adapted to be inserted. The platen 13 is spring loaded, as hereinafter described, to move downwardly to a reading position and to thereby actuate a plurality of reading contact pins 14 and is held in the loaded position by a platen latch mechanism 15. When the code card 11 is inserted into the reader 10, a small microswitch 16 which is mounted to the back portion of the reader 10 is actuated and energizes a solenoid 17 coupled to release the platen latch mechanism 15. Therefore as soon as a card 11 is inserted into the unit, the mechanism is triggered to move the platen 13 which serves to clamp the card within the housing 9 and prevents withdrawal therefrom without resetting of the reader 10.

In accordance with the present invention, a reset lever 18 is rotatably mounted on the exterior of the housing 9 and coupled through a reset lever mechanism 19 to reset the upper platen 13 in the original position.

Further, in accordance with the present invention, before the reset lever 18 can be actuated, a readout relating to the product just dispensed must be effected through actuation of a control switch 20 mounted within the front lower portion of the weatherproof housing 9 and actuated by an exterior push button 21 shown in FIG. 1. Actuation of switch 20 establishes an output signal to a readout control at station 8 which will automatically record the information of the previous transaction stored in a suitable memory device, not shown, as a result of proper insertion of the card and operation of reader 10. When the readout has completed its automatic cycle, a signal is fed back to the weatherproof enclosure or housing 9 and actuates a handle release solenoid 22 which releases a handle latch mechanism 23 for the reset handle or lever 18 and permits resetting of the card reader 10.

Normally, the push button switch 20 will also be interlocked with the discharge mechanism to prevent operation of a readout while delivery is being made. Furthermore, the discharge mechanism will include a suitable mechanism such that once delivery has been stopped and the push button switch 20 operated, discharge cannot again be established without receiving a signal from the code card reader, as schematically shown and hereinafter described in connection with the circuit of FIG. 6.

As more fully described in connection with FIG. 6, the microswitch 16 is connected in the power circuit for trip release solenoid 17 in series with a switch 24 actuated by latch mechanism 15 to initiate a time delay therein which delays having current or power applied to contacts 14 and thereby permits them to first move to a completely static condition. When the reader 10 is to be reset, the actuating handle or lever 18 first actuates a hermetically sealed switch 25 which removes power from the card reader 10 before it initiates movement of the platen latch mechanism 15 and card reader platen 13 with the associated contacts 11. Consequently, the mechanical and electrical operating system actuates card reader 10 in a manner such that the contact circuit is never broken or made with power applied to the contacts. This feature is substantially practically significant in permitting construction and application of the reader in a hazardous location.

More particularly, in the illustrated embodiment of the invention, the weatherproof housing 9 includes a shallow cup-shaped mounting base to which a deep top member is secured by a plurality of screws or the like. The front of the top member includes a set of instructions 26 to one side thereof, as shown in FIG. 1, and a mounted cover 27 pivotally secured to the top member along its upper edge and depending downwardly in overlying covering relation to the card reader opening 12. An insulating and sealing pad 28 is secured to the inner face of the cover 27 and bears on the adjacent portion of the top member to essentially prevent entrance of water or other foreign matter of any significant size to produce and maintain a weatherproof enclosure. The weight of the cover 27 is sufficient to prevent uncovering of the opening as a result of wind or the like. Lever 18 is disposed to one side of the top member and connected to a reset input shaft 29 by a clamping bolt 30. Within the enclosure 9, a horizontal mounting plate 31 is secured to suitable pedestals 32 on the housing base by a plurality of mounting bolts 33 and is located slightly below the level of the opening 12 for the code card 11.

The card reader 10 is secured within an opening in the mounting plate 31 by suitable support brackets 34 with the card opening 11 immediately above plate 31 with the platen 13 in the reset position. The card reader as more fully disclosed in U.S. Patent 2,924,678 includes a lower contact plate 35 within which a plurality of small terminal sockets 36 are mounted in a predetermined array, corresponding to the permissible hole arrangement in the card 11. Immediately above the contact plate 35 is a second fixed plate 37 containing a similar aligned array of contact sockets 38 through which contact terminal pins 14 pass. The movable platen 13 is disposed above the second fixed plate 37 and includes a plurality of pin apertures arrayed in accordance with the array of the sockets. The pins 14 are slidably mounted within the sockets 38 and the apertures of platen 13. The code card 11 is provided with apertures in only selected positions. When the card 11 is properly inserted within the card reader 10 and the movable platen 13 moves down, the continuous portion of the code card engages the aligned pins 14 and forces them downwardly into the corresponding sockets 36 to complete the circuit between sockets 38 and 36 whereas the holes in the card 11 provide a path through which the pins 14 pass freely, remaining in the original position to prevent completion of the circuit between the correspondingly located sockets 36 and 38.

The movable platen 13, as more clearly disclosed in the previously referred to patent, is spring loaded as by a plurality of springs 40 acting between a base structure 41 and a bottom movable plate 42 which is secured to platen 13 by long bolts 43 to continuously urge the platen downwardly into the reading position. The latch mechanism 15 includes a lever 44 pivotally mounted to structure 41 to the underside of plate 42 and includes an upwardly projecting arm terminating in a small bearing wheel 45 aligned with the center of the plate 42. The opposite end of the lever 44 is pivotally secured to the lower end of a latch rod or shaft 46 which is slidably journaled for vertical movement in a latch bearing or hub 47. The shaft 46 includes a small groove or detent 48 generally centrally thereof which is adapted to be aligned with and selectively engaged by a latch plate 49 to hold the shaft in a lowered or reset position. The plate 49 is pivotally pinned within the hub 47 and adapted to pivotally move from latching engagement within the detent 48 to release the shaft 46 and permit the springs 40 to close the platen plates.

The reader 10 is reset by actuation of the reset lever 18 which, through mechanism 19, depresses the shaft 46 until the latch plate 49 moves into engagement with the recess 48 to releasably lock the shaft 46 in the depressed position with the card reader 10 in the card receiving position.

The latch plate 49 is controlled by trip solenoid 17, mounted to the underside of the base plate 31 and having its armature projecting forwardly to the one side of the hub 49 and connected to the outer end of the latch plate 49. The plate 49 is pivotally held within a slot for engagement and disengagement with the detent 48. A coil spring 50 is connected to the outer end of the plate 49 to continuously urge the solenoid armature outwardly to an extended reset position with the latch plate 49 pivoted in a direction to move into latching engagement with the groove 48 in the shaft 46. When the solenoid 17 is energized, the force of the spring 50 is overcome and the latch plate 49 pivoted to disengage the shaft detent 48 whereby the force of the springs 40 rapidly move the platen 13 downwardly over the pins 14 and lock in the code card 11 which was previously inserted therein and actuated the switch 16.

The microswitch 16 is mounted by a suitable bracket to the back side of the card reader 10 and in slightly spaced relation thereto. The switch 16 is generally aligned with an actuating rod or plunger 51 slidably mounted within the reader platen 13, and moved by the card 11. A small lever plate 52 is secured to the top side of the switch 16 and extends downwardly in the path of the plunger 51. When the card 11 is inserted into the card reader 10 and positioned with the holes in the card 11 aligned with the proper pins 14 of the card reader, the microswitch 16 is closed to energize the solenoid 17 and release the latch mechanism 15. The time to trigger the microswitch 16, release the plate 49 and cause the platen 13 to move into clamping engagement is sufficiently short to prevent insertion and removal of the card 11. Consequently, once the microswitch 16 has been actuated, the card 11 is locked in the card reader 10 and can only be removed by operation of the reset lever 18. This in turn can only be accomplished by effecting a readout through operation of the push button 21 and thereafter operating lever 18 and thereby mechanism 19.

The reset lever 18 is suitably connected to the reset shaft 29 of mechanism 19. Shaft 29 is journaled within a bearing 53 which is carried by a mounting plate 54 to the top of the base plate 31. The inner end of the shaft 29 carries a switch cam 55 having a small pin 56 projecting forwardly therefrom and into a slot or recess 57 on the periphery of an enlarged cam shaft 58 to form a lost motion coupling between shafts 29 and 58. Shaft 58 is journaled in a second bearing 59 secured to the plate 54 in properly spaced aligned relation to the first bearing 53. The interlock switch 25 is mounted to the base plate 54 by a U-shaped mounting bracket 60 secured to the base plate with the arms 61 projecting upwardly in parallel relation therefrom immediately forwardly of the shaft 58. The switch 25 is mounted to the arm of bracket 60 with a switch lever 62 projecting forwardly therefrom toward the cam hub 55 which has a small arm 63 projecting laterally beneath the switch lever and in vertically spaced relation thereto. A set adjustment screw 64 projects upwardly through the cam arm 63 in alignment with the switch lever 62 to permit adjusting the distance cam hub 55 rotates to actuate the switch. This adjustment is set to actuate the switch 25 within the movement of the lever 18 permitted by the pin movement within the recess 57 but less than such movement which can be made by the tolerance in the lever and shaft assembly.

A locking cam 65 is centrally secured to the outer end of the cam shaft 58 and is generally an elongated lever member having a first portion or arm 66 projecting rearwardly immediately above the plate 54. A locking armature shaft 67 is slidably mounted within an enlargement of the bearing 59 and normally overlies the locking arm 66 of the cam 65 to prevent rotation of the cam 65 and therefore the lever 30. The armature shaft 67 has its opposite end reduced into a small rectangular projection mating and pinned, as at 68, with a corresponding slot in the outer end of a solenoid armature 69 forming a part of the operating handle trip solenoid 22. A bias spring 71 encircles the shaft 67 and the armature 69 and acts between the solenoid winding portion proper and a small hub or flange 72 secured to the armature shaft 67 to continuously urge the shaft 67 outwardly overlying the arm 66 to lock the cam 65 and the lever mechanism 19 against rotation. When the operator wishes to reset the mechanism 19 in order to withdraw the card 11, he must first actuate the push button switch 21 which creates a readout signal to actuate a readout mechanism in station 8 to record the transaction. The readout mechanism automatically completes its cycle and then conditions a circuit for energizing the trip solenoid 22 through the circuit of the switch 25. Consequently, after completion of the readout, the lever 18 is pivoted to the degree permitted by the small cam recess 57 to close switch 25 and thereby energize the solenoid to withdraw the armature shaft 67 after which the cam 65 is free to rotate such that reset lever or handle 18 can be rotated sufficiently to reset mechanism 15 as follows.

The inner end of the cam 65 includes a forwardly projecting arm 73 terminating in a small bearing wheel 74 in alignment with the reset or latching shaft 24 which projects upwardly through plate 31 and terminates in an enlarged cam head 75.

When the cam 65 is rotated, the outer end of the lever arm 73 engages the head 75 and forces the reset shaft 46 downwardly until the latching slot 48 is aligned with the latch plate 49. As previously noted, the latch plate 49 is continuously biased into engagement with the periphery of the shaft 46 and moves into the aligned slot to latch the shaft 47 and therefore mechanism 15 in the reset position. During the downward movement of the rod or shaft 46 the reset mechanism 15 pivots in a counterclockwise direction as viewed in FIG. 3 and resets the card reader 10 with the platen 13 returned to the raised position in spaced relation to the pins 14 which release the code card 11 to the operator.

A switch operator bracket 76 is secured to the head 75 of shaft 46 and projects laterally beneath switch 24 to actuate the switch in the triggered position of the card reader 10 and to reset switch 24 simultaneously with resetting of the mechanism 15. Switch 24 is thus actuated only after the card reader 10 has moved to the static reading position and is connected to restrict power application prior thereto, as more fully described in connection with FIG. 6.

A similar operating bracket 77 is secured to head 75 and positioned to actuate a similar small microswitch 78 with the mechanism 15 reset. Switch 78 provides an appropriate disconnect signal at the station 8 to prevent actuation of the readout unless the reader 10 is triggered to the reading position.

In the illustrated embodiment of the invention, a cover interlock switch 79 is mounted on the mounting plate 31 by a suitable bracket 80 and located immediately adjacent the normal upper wall position of the top member of housing 9. When the cover is in position, the switch 79 will condition the overall circuit for operation.

The overall operation of the circuit is summarized in connection with a control circuit schematically shown in FIG. 6 wherein the circuit is shown with the reader in the reset position for receiving a code card. A single code row of contacts of the card reader 10 is diagrammatically shown as a plurality of switches 81 for simplicity and clarity of illustration. Each switch 81 corresponds to the contact sockets 36 and 38 and a movable contact terminal pin 14 of FIGS. 1–4. Each of the switches 81 is similarly connected between a common line 82 and an individual signal or code line 83 to provide controlled circuits between the common and the code lines. Whenever a continuous portion of the code card is aligned with a corresponding terminal pin 14, a closed switch 81 results and the circuit through the code line 83 establishes a coded electrical signal.

Different combinations, one for each customer, of the switches 81 is effective to release products for delivery such that a proper code card 11 must be inserted within the code card reader 10 to effect a release. Further, the code card may carry any other desired information through the method of normal coded signals; for example, the customer number, the products authorized for this particular card and the like.

The input control circuit shown in FIG. 6 includes suitable power lines 84 connected between station 8 and unit 1. The momentary trip solenoid 17 is connected to the power lines 84 in series with a set of normally open contacts 85 of the code registry switch 16 and in series with a set of normally closed contacts 86 of the card reader interlock switch 24. Thus, when the code card 11 is first inserted into the circuit, the switch 16 is momentarily closed and completes the circuit to the trip solenoid 17 to release shaft 46 and the interconnected latching mechanism 15 of the card reader 10. The platen 13 then rapidly drops to clamp the code card 11 within the reader 10. The dropping of the reset and latch shaft 46 releases the switch 78 which closes and provides the signal at station 8 via signal line 87 of the tripped condition. When the code card reader 10 is tripped and platen 13 is in the static reading position, the operator 76 engages the switch 24 to open contacts 86 and close contacts 88. Contacts 88 are connected via lines 89 and switch 25 to the code reader 10 and controls completion of the control circuit to station 8 and thereby controls the application of power to reader 10 and operation thereof to permit discharge of material if proper code signals are received from the code card reader 10. Thereafter, the driver may withdraw material or a product to the desired amount.

A suitable recording means, not shown, records the amount of the product withdrawn. When delivery is completed and the operator wishes to withdraw his card, he first actuates the push button switch 21, shown as a single-pole, double-throw switch having normally closed contacts 90 connected in the control circuit to provide a signal to the central station system to prevent a readout operation with the delivery system in operation. The push button switch 21 includes normally open contacts 91 connected to the central station 8 to trigger the readout means. A signal lamp 92 is connected in series with a suitable switch 93 in the readout unit to provide a continuous indication during the readout period such that the driver will know that the readout is taking place. When the readout has been completed, the switch 93 will open and turn off the lamp 92 such that the operator will know that he can operate the lever 18 to withdraw the card 11.

A normally open switch 94 of the readout unit is connected in series with the switch 25, actuated by lever 18, and the release solenoid 22. Switch 94 is closed when the readout is completed. The operating switch 25 is a normally open switch which is closed by cam 55 upon the initial rotation of the lever 18 to energize solenoid 22. This retracts the locking armature shaft 67 from locking engagement with the lever arm 66 of the cam 65 to permit continued rotation and resetting of the card reader 10 as heretofore described. With the reader reset, the code card 11 can be removed from the card reader.

During the initial movement of the reset lever 18, the switch arm 63 moves downwardly from the switch 25 which also controls the application of power to the contact sockets 36 and 38 of reader 10. Consequently, prior to movement of the contact pins 14 of the card reader 10 from the static reading position, the switch 25 is actuated to completely remove power from the card reader contact sockets 36 and 38. When the platen 13 subsequently moves to the reset position and the pins 14 are reset to the standby position, the reader 10 is in a completely de-energized state. The only switching within the card reader 10 is done within hermetically enclosed switches which provide the necessary protection against possible explosion and consequently the enclosure may be of the general purpose type. This provides a relatively simple and inexpensive enclosure without requiring a specially constructed card reader.

Various modes of carrying out the invention are contemplated as being within the scope of the following claims particularly pointing out and distinctly claiming the subject matter which is regarded as the invention.

We claim:
1. In a code card reader unit,
a code reader having a plurality of electrical circuits interconnected to provide a plurality of different operable permutations, each circuit including contacts movable relative to each other and having a standby position and a static reading position, each of said permutations being related to a corresponding code input member engaging said contacts and permitting movement of only selected related electrical contacts relative to each other from the standby position to the static reading position,
power control switch means connected to control the application and the removal of power to the contacts, said switch means being within an explosion proof enclosure means, and
means coupled to the code reader and to the power control switch means and sequentially moving the contacts and the power control switch means between said positions and moving the contacts to a static reading position before actuation of the power control means for the application of power to the contacts and actuating the power control switch means and removing power from the contacts before the movement of the contacts to the standby position whereby said reader unit is adapted for installation within an explosive environment.

2. In a code reader unit,
a code reader having a plurality of related circuit contacts connected in a coded control circuit and having reading means movable between a reading position for connecting related contacts and a standby position for disconnecting said related contacts, said code reader having means to support a control member disposed between said contacts and operable to restrict the connection within the circuit to selected related circuit contacts as said reading means moves between said positions,
switch means to control application and removal of power to said contacts, and
means connected to said reading means and said switch means and moving said reading means and said switch means in timed spaced relation and actuating the switch means to apply power to the contacts only after actuating the reading means to the reading position and actuating the switch means to remove power from the contacts prior to actuating the reading means for reset to the standby position.

3. The code reader unit of claim 2 having an outer weatherproof enclosure to permit outdoor mounting of the code reader unit.

4. In a code reader unit,
a code reader having a plurality of related circuit contacts connected in a coded control circuit and having reading means movable between a reading position for connecting related contacts and a standby position for disconnecting said related contacts, said code reader having means to support a control member disposed between said contacts to control the connecting of the circuit between the related circuit contacts as said reading means moves between said positions,
means urging the reading means to a reading position,
a movable latch means holding the reading means in the standby position,
release means for said latch means,
a pair of switches to conjointly control the release means for releasing of said reading means,
means for operating one of said switches in response to proper registry of said control member,
means coupling the latch means to the other of said switches to condition the release means for operation only with the reading means in the standby positions, and
power connecting switch means actuated by said latch means and connected to said contacts to apply power to the contacts only after the reading means is in the reading position.

5. The code reader unit of claim 4 having
a separate switch means for removing power from said contacts, and
reset means to reset said latch means and thereby the reading means and including means to actuate said separate switch means prior to resetting of the reading means.

6. The code reader unit of claim 5 wherein an electrically operated locking means is coupled to the reset means to prevent movement thereof and connected for simultaneous operation with the separate switch means to release the locking means with the removal of power from said contacts.

7. The code card reader unit of claim 5 having means to lock the control member within the reader in response to movement of the reading means to the reading position.

8. In a code reader unit for controlling dispensing of petroleum products at a bulk plant and for recording each transaction by operation of a remote readout device, the improvement comprising
a code card reader having a card chamber to receive a multiple punched code card, said reader having a movable spring-loaded platen forming a part of said card chamber and a plurality of contact pins slidably mounted within the platen to one side of the card chamber, said platen being resiliently loaded to move from a standby position to a reading position with said code card serving to force all contact pins aligned with continuous card portions to move with the platen while contact pins aligned with an opening remain in the standby position,
a first control switch mounted for actuation by proper registry of the code card with respect to the contact pins,
a latch linkage mechanism including a latch element and coupled to the platen to hold the platen in the standby position, said linkage including a pair of switch operating means,
a second control switch mounted to be actuated by one of the switch operating means with the platen held in the standby position,
a third control switch mounted to be actuated by the other of the switch operating means with the platen in the reading position,
a rotating reset mechanism having an input member coupled to a reset member by a lost motion coupling,
a fourth control switch mounted for actuation by the movement of the input member provided by the lost motion coupling,
an electromagnetic release means for said latch element and connected in an operating circuit with the first and second control switches to control the latch element to release the platen,
means to apply power to said contacts and connected in circuit with the third control switch, and
means to remove power from said contacts and connected with said fourth control switch for removing said power prior to resetting of the platen.

9. The code reader unit of claim 8 including
a latch mechanism releasably coupled to said reset member and holding said reset member against movement,
a second electromagnetic means to actuate said latch mechanism,
a readout completed responsive switch, and
a control switch actuated conjointly with the fourth control switch and connected in an energizing circuit with the readout completed responsive switch and the second electromagnetic means whereby said latch linkage mechanism cannot be actuated to reset the platen prior to the completion of a readout.

10. The code reader unit of claim 8 wherein said reset mechanism includes,
a pair of axially aligned rotatable shafts interconnected by a pin and slot connection, one of said shafts constituting an input shaft and the second constituting a reset shaft,
a switch operator connected to the reset shaft and coupled to the fourth control switch to operate the switch only after movement through said slot,
locking means connected to the reset shaft, and
release means connected to the locking means and responsive to movement of the input shaft to actuate the fourth control switch to release the reset shaft.

11. In a code reader unit for use in an explosive environment,
a code reader having a plurality of related contacts connected in a coded control circuit and having reading means movable between a standby position and a reading position for making and breaking a circuit between the relative contacts, said reader having means to support a punched card member disposed between said contacts and operable to engage one group of the contacts to control the selective completion of the circuit of the related circuit contacts,
hermetically enclosed switch means to control application of power to said contacts, and
means for operating said reading means and said switch means in time spaced relation and actuating the switch means to apply power to the contacts only after actuating the reading means to the reading position and actuating the switch means to remove power from the contacts prior to actuating and resetting of the reading means to the standby position.

12. The code reader unit of claim 11 wherein said switch means includes a pair of switches connected to conjointly control application of power to said contacts, one of said switches being actuated by positioning of the card member in the reader and the other of said switches being actuated by final operation of the means to move the reading means.

13. In a code reader unit for use in an explosive environment,
- a code reader having a plurality of related contacts connected in a coded control circuit and having reading means movable between a standby position and a reading position for making and breaking a circuit between the related contacts, said reader having means to support a punched card member disposed between said contacts to control the selective completion of the circuit of the related circuit contacts,
- a pair of hermetically enclosed switch means connected in a power circuit with said code reader with the first of the switch means completing the power circuit to said contacts and the second of the switch means breaking the same power circuit to said contacts,
- means moving the reading means from the standby position to the reading position, and
- a reset mechanism connected to said reading means and including a member moved by said reading means in moving to the reading position coupled to said first switch means and actuating said first switch means to apply power to the contacts only after the reading means has moved to the reading position and including second means coupled to the second switch to remove power from the contacts, said second means including an input member initially movable independently of movement of said reading means for operating the second switch before resetting of the reading means to the standby position.

14. In a code reader unit for use in an explosive environment,
- a code reader having a plurality of related opposed contacts connected in a coder control circuit and having reading means for simultaneously moving corresponding contacts of said related contacts with respect to the others between a standby open circuit position and a reading closed circuit position, said reader having means to support an apertured code member between said opposed contacts to restrict completion of the circuit of the related opposed contacts to those aligned with an aperture,
- said reading means being spring loaded to urge the reading means to a reading position,
- means associated with the reading means to clamp said control member in the reading position,
- a latch and reset mechanism connected to the reading means and settable to the latch position holding the reading means in the standby position,
- a reset lever coupled to the latch mechanism to set the latch mechanism in the latch position and to open said contacts after a predetermined movement of the lever,
- means responsive to selected insertion of a control member to trip the latch mechanism and release the reading means and thereby move the contacts to the reading position with the control member locked therein,
- a hermetically enclosed switch means actuated by said latch mechanism in the reading position and connected to complete a power connection to said contacts only after the contacts are in a static reading position, and
- a hermetically enclosed switch means actuated by said reset lever and connected to open said power connection to said contacts upon initial movement of the reset lever and prior to said predetermined contact opening movement.

15. In a code reader unit for use in an explosive environment,
- a code reader having a plurality of related circuit contacts connected in a coded control circuit and having reading means for simultaneously moving said related contacts with respect to each other between a standby position and a reading position, said reader having means to support a control member disposed between said contacts to control the selective completion of the circuit of the related circuit contacts,
- said related contacts including a terminal socket and a terminal pin, said sockets being mounted in fixed relation and said pins being axially movable into and out of the related sockets, said reading means including a platen with the terminal pins slidably mounted therein and held in spaced relation to the fixed sockets and having a card chamber disposed immediately above the pins in the standby position, said platen being urged by resilient means to move downwardly over said pins,
- a latch mechanism including a reciprocal latch rod connected to a pivotally mounted positioning mechanism operably coupled to said movable platen and a latch plate biased to engage the periphery of the rod, said latch rod having a detent engageable with the latch plate to hold the latch rod in a reset position wherein the positioning mechanism holds the movable platen in the standby position,
- a card registry means for releasing said latch plate, a power application switch disposed in the path of the rod and actuated by the rod in the fully tripped position whereby power is applied to the terminal pins and sockets only in the static reading position,
- a reset shaft having a standby position and having a laterally extending reset arm connected thereto,
- a reset cam shaft connected to the reset shaft by a pin and slot to permit limited relative movement of the reset shaft,
- a reset switch mounted in the path of the reset arm and actuated during the relative movement of the reset shaft from the standby position to disconnect power from the pins and socket,
- a cam connected to the cam shaft and having a first arm overlying the rod for resetting of the rod to engage said plate and detent and a second arm,
- a locking shaft slidably mounted and urged into an overlying locking position in the path of said second arm to normally prevent rotation of said cam, and
- an electromagnetic operator connected to said locking shaft and connected in circuit with the reset switch to release said cam only after opening of the power circuit to the contacts by said reset switch.

16. In a code reader unit for use in an explosive environment,
- a code reader having a plurality of related circuit contacts including separately movable members for making and breaking the circuit between the related circuit contacts, reading means for simultaneously moving said movable members between a standby position and a reading position and being spring loaded to the reading position, said reading means having means to support a punched control member in operative engagement with said members and moving all members aligned with continuous portions of the member to control the selective completion between the corresponding related circuit contacts,
- a latch mechanism connected to said reading means for holding the reading means in the standby position,
- a card registry means for releasing said latch mechanism,
- a power application switch disposed in the path of the latch mechanism and actuated by the final released movement of the latch mechanism whereby power is applied to the contacts only in the static reading position,
- a reset shaft having a standby position and having a laterally extending reset arm connected thereto,
- a reset cam shaft connected to the reset shaft by a lost motion coupling to permit limited relative initial movement of the reset shaft independently of said cam shaft, a reset switch mounted in the path of the reset arm and actuated during the relative movement of the reset shaft from the standby position to disconnect power from the contacts, a cam connected to the cam shaft and having a first member releasably engaging the latch mechanism for resetting thereof and having a locking portion, a locking member positioned to engage the locking portion to normally prevent movement of said cam, and an electromagnetic operator connected to said locking member and connected in a circuit with the reset switch to release said cam only after opening of the power circuit to the contacts by said reset switch.

17. The code reader unit of claim 16 including an outer weatherproof enclosure having a removable wall, and a switch connected in the power circuit connection to prevent operation with the wall removed.

References Cited

UNITED STATES PATENTS

| | | | |
|---|---|---|---|
| 2,837,617 | 6/1958 | Weisser | 200—168 |
| 2,924,678 | 2/1960 | Hickok | 200—46 |
| 2,967,916 | 1/1961 | Williams | 200—46 |
| 3,085,140 | 4/1963 | Roe | 200—168 |

BERNARD A. GILHEANY, *Primary Examiner.*

H. E. SPRINGBORN, *Assistant Examiner.*